(12) United States Patent
D'Agostini et al.

(10) Patent No.: US 6,968,791 B2
(45) Date of Patent: Nov. 29, 2005

(54) OXYGEN-ENRICHED CO-FIRING OF SECONDARY FUELS IN SLAGGING CYCLONE COMBUSTORS

(75) Inventors: Mark Daniel D'Agostini, Hazleton, PA (US); Kevin Boyle Fogash, Wescosville, PA (US); Francis Anthony Milcetich, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/645,194

(22) Filed: Aug. 21, 2003

(65) Prior Publication Data
US 2005/0039653 A1  Feb. 24, 2005

(51) Int. Cl.[7] .............................. F23D 1/02; F23J 15/00
(52) U.S. Cl. ..................... 110/347; 110/345; 110/264
(58) Field of Search ........................ 122/247; 110/264, 110/262, 213, 345, 346, 347; 44/620

(56) References Cited

U.S. PATENT DOCUMENTS

| | | | |
|---|---|---|---|
| 2,745,732 A | 5/1956 | Oster ............................. 75/26 |
| 2,973,727 A * | 3/1961 | Northcote ................... 431/173 |
| 3,894,834 A | 7/1975 | Estes .......................... 431/174 |
| 4,343,606 A | 8/1982 | Blair et al. .................... 431/10 |
| 4,427,362 A | 1/1984 | Dykema ........................ 431/4 |
| 4,598,652 A | 7/1986 | Hepworth ................... 110/345 |
| 4,763,583 A * | 8/1988 | Przewalski .................. 110/246 |
| 5,014,631 A * | 5/1991 | Ikeda et al. ................. 110/264 |
| 5,022,329 A | 6/1991 | Rackley et al. ............. 110/234 |
| 5,052,312 A | 10/1991 | Rackley et al. ............. 110/346 |
| 5,572,956 A * | 11/1996 | Hallstrom et al. .......... 122/247 |
| 5,690,039 A * | 11/1997 | Monro et al. ............... 110/264 |
| 5,765,488 A * | 6/1998 | Vatsky ........................ 110/261 |
| 5,878,700 A | 3/1999 | Farzan et al. ............... 122/4 D |
| 6,085,674 A | 7/2000 | Ashworth ................... 110/347 |
| 6,089,855 A * | 7/2000 | Becker et al. ................. 431/9 |
| 6,152,054 A * | 11/2000 | Ashworth et al. .......... 110/345 |
| 6,325,002 B1 | 12/2001 | Ashworth ................... 110/345 |
| 6,363,868 B1 * | 4/2002 | Boswell et al. ............. 110/213 |
| 6,394,790 B1 | 5/2002 | Kobayashi ................... 431/10 |
| 2002/0184817 A1 | 12/2002 | Johnson et al. ............... 44/620 |
| 2003/0009932 A1 | 1/2003 | Kobayashi et al. ........... 44/620 |

* cited by examiner

*Primary Examiner*—Kenneth Rinehart
(74) *Attorney, Agent, or Firm*—Keith D. Gourley

(57) ABSTRACT

A method for operating a cyclone combustor having first and second burners in communication with a barrel includes: feeding a stream of a primary fuel and a primary oxidant having a first oxygen concentration into the first burner; feeding a stream of a secondary fuel and a secondary oxidant having a second oxygen concentration greater than or equal to the first oxygen concentration into the second burner; combusting at least a portion of the primary fuel with at least a portion of the primary oxidant in the barrel of the cyclone combustor, thereby forming a plurality of primary products of combustion in the barrel; and combusting at least a portion of the secondary fuel with at least a portion of the secondary oxidant, thereby forming a plurality of secondary products of combustion and a secondary flame, the secondary flame generating a supplemental radiant heat in the barrel.

24 Claims, 7 Drawing Sheets

OXYGEN-ENRICHED CO-FIRING OF SECONDARY FUELS IN SLAGGING CYCLONE COMBUSTORS

BACKGROUND OF THE INVENTION

The present invention relates generally to the field of fossil fuel cyclone-fired boilers, and in particular to the use of oxygen enrichment of a secondary fuel in the barrel of a slagging cyclone combustor to maintain desired slag flow characteristics, thereby broadening the range of amenable fuels and operating conditions while lowering operating costs, improving combustion efficiency, and reducing nitrogen oxide emissions.

Cyclone-fired boilers were developed in the 1940s primarily to improve the firing of coals with low ash-fusion temperature through minimizing the ash-induced slagging/fouling of high temperature heat transfer surfaces within the boiler. This was accomplished by combusting the coal and simultaneously melting the ash in a high-temperature chamber adjacent to the boiler, discharging the essentially ash-free products of combustion into the boiler and draining the molten slag to a tank at the bottom of the furnace. While this indeed reduced boiler-side fouling, the need to maintain a continuously-draining molten ash placed restrictions on the amenable coal supply and generally reduced the operating flexibility and load-following capability of the unit. Moreover, localized slag solidification within the cyclone often reduces unit availability relative to pulverized coal boilers. Finally, because of the high-temperatures needed to melt the slag, and the tendency to run at or above a stoichiometric ratio of 1.0 due to concerns over corrosion, cyclone combustors are known to generate relatively high levels of nitrogen oxide (NOx) emissions, typically in the range of 1.0–2.0 lb $NO_2$/MMBtu prior to post-combustion treatment. Hence, the limitations on NOx imposed by the 1990 Clean Air Act Amendments are particularly challenging and costly to achieve within fossil fuel cyclone-fired boilers. (The stoichiometric ratio represents the relative proportion of oxidant to fuel used in the combustion process. A stoichiometric ratio of 1.0 is the theoretical minimum needed for complete combustion of the fuel, while a stoichiometric ratio less than 1.0 signifies fuel-rich combustion.)

A typical cyclone combustor 10 is illustrated in FIG. 1. Conventional combustion within a slagging cyclone combustor of this design is carried out by injecting crushed coal and primary air through a coal pipe 12 to a burner 14. Tertiary air enters the burner at the tertiary air inlet 16, and secondary air (the main combustion air) enters the cyclone combustor at the secondary air inlet 18. The burner, which imparts a swirl motion to the crushed coal in the same rotation as the secondary air, injects a coal/air mixture with high tangential velocity into a refractory lined combustion chamber or barrel 20. The coal is crushed (~95% through 4 mesh [4.8 mm] screen) rather than pulverized (~70–80% through 200 mesh [70 microns] screen) to minimize the escape of fines from the barrel. Coal particles are thrown outward as the flow spins through the barrel, creating a region of high heat release adjacent the refractory lining of the barrel wall. The high temperature in this region causes the ash contained within the coal to melt. The molten "slag" 22 acts as a trap for the carbon-rich coal particles, retaining the particles for a period of time far greater than the average gas residence time within the barrel, thereby enabling a high degree of carbon burnout. The molten slag eventually migrates forward along the wall of the barrel, exits at the slag spout opening 24, and continuously drains through a slag tap opening 26 located below the re-entrant throat 28. The gas flow makes a triple pass—initially swirling along the barrel wall toward the re-entrant throat, then swirling upstream within an annular region, and finally turning and exiting from the barrel through the re-entrant throat into the furnace 30.

Oxygen enrichment has not been used in cyclone combustors to refuel cyclone-fired boilers with coals that are not amenable to air-fuel slagging operation. However, the use of oxygen enrichment to maintain molten slag and accelerate combustion within cyclone combustors has been considered. For example, U.S. Pat. No. 2,745,732 (Oster) discloses the use of oxygen enrichment in a cyclone combustor to sustain a molten slag layer under reducing conditions in order to maximize recovery of metallic iron from the ash. The oxygen used for this purpose is introduced via a high-velocity, pre-heated, oxygen-enriched secondary air stream injected tangentially into the cyclone.

U.S. Pat. No. 4,598,652 (Hepworth) discusses the possibility of using oxygen enrichment in a coal-fired cyclone combustor in which iron oxide particles are injected for sulfur capture. Although oxygen enrichment is mentioned as a possible means of accelerating the rates of reaction, there is no discussion regarding how or where the oxygen would be introduced into the cyclone combustor.

Techniques for controlling ash viscosity in cyclones without the use of oxygen enrichment also have been considered. U.S. Pat. No. 5,022,329 (Rackley, et al.) and U.S. Pat. No. 5,052,312 (Rackley et al.) teach the addition of fluxing agents to maintain the T250 of the ash below 2500° F. to limit the vaporization of heavy metals. (The T250 value denotes the temperature at which a coal slag has a viscosity of 250 centipoise.)

U.S. Pat. No. 6,085,674 (Ashworth) discusses the addition of lime or limestone into a cyclone to lower ash viscosity. U.S. Patent Application No. 2002/0184817 (Johnson, et al.) describes the use of an iron-based additive to modify the viscosity and slagging characteristics of coals, particularly low-sulfur Western U.S. coals.

With regard to NOx reduction in cyclone combustors, U.S. Pat. No. 5,878,700 (Farzan, et al.) proposes injection of a secondary fuel (reburn fuel) along the axis of the barrel to convert NOx formed within the barrel to $N_2$ as gases are discharged from the unit. However, this patent does not teach the use of oxygen or oxygen-enriched air. Also, it teaches that the secondary fuel stream passes through the cyclone barrel with a minimum of reaction.

U.S. Pat. No. 6,085,674 (Ashworth) proposes NOx reduction through a combination of steam injection and a three-stage combustion process comprised of a fuel-rich barrel operation followed by two distinct stages of air addition. U.S. Pat. No. 6,325,002 (Ashworth) further proposes injection of tertiary and overfire air in such a way as to create in-situ recirculation of flue gases to dilute the products of combustion and further lower NOx. Neither of these references discloses or teaches the use of oxygen enrichment as a means to reduce NOx.

Several references contemplate NOx reduction with the aid of oxygen enrichment, but without specific reference to cyclone combustors. U.S. Pat. No. 4,427,362 (Dykema) describes a combustion method requiring a high-temperature, fuel-rich first stage for the purpose of reducing NOx emissions. The high temperature (at least 1800K) is required to accelerate reaction kinetics, while fuel-rich conditions (stoichiometric ratio between 0.45–0.75) are needed to establish equilibrium chemistry with minimal NOx formation. Although this patent mentions the possibility of using oxygen enrichment, it does not provide any information on how oxygen would be introduced into the system. Moreover, this patent does not teach the use of oxygen enrichment in cyclone combustors.

A similar approach to NOx reduction is discussed in U.S. Pat. No. 4,343,606 (Blair, et al.) except that this reference includes one or more secondary air injection points to complete combustion, while also omitting particulate injection. This patent teaches a first stage equivalence ratio of greater than about 1.4 (stoichiometric ratio less than about 0.7), while allowing for enrichment of air with between 6 and 15 weight percent oxygen. However, no details are provided regarding the means of introduction of the oxygen, nor is there any discussion regarding operational issues specific to cyclone combustors.

U.S. Pat. No. 6,394,790 (Kobayashi) discloses a method for NOx reduction via deeply staged (i.e., exceedingly fuel-rich) oxygen-enriched primary combustion coupled with secondary oxidant injection. The oxygen concentration of the primary oxidizer is at least 30%, while the required oxidizer to fuel ratio in the primary stage is between 5% and 50% of stoichiometric. This patent teaches that high velocity injection of reactants is key to NOx reduction since the vigorous mixing it induces will serve to lower the reaction temperature. The only solid fuel explicitly mentioned in this patent is pulverized coal, suggesting that application to slagging cyclone combustors was not intended.

U.S. Patent Application No. 2003/0009932 (Kobayashi, et al.) also addresses NOx reduction in coal-fired boilers via a fuel-rich first combustion stage with oxygen enrichment up to 8 volume percent. No fixed limits are placed on the first stage stoichiometric ratio, and no mention is made of ash fusibility or viscosity. Several references are made to pulverized coal (in contrast to crushed coal) and low NOx burners, suggesting that application of the method to cyclone combustors was not intended. This patent application suggests that there is a certain stoichiometric ratio (not precisely quantified) below which NOx emissions will be reduced with oxygen-enriched combustion relative to air-fuel combustion. However, the application does not contemplate the influence of aerodynamics, mixing or particle time-temperature history on NOx characteristics.

U.S. Pat. No. 3,894,834 (Estes) describes an oxy/fuel burner mounted centrally along the axis of a pulverized coal/air burner. The primary purpose of this arrangement is to improve flame stability and control flame length. The teachings of this patent do not pertain to slagging cyclone combustors.

A fundamental requirement for stable operation of a slagging cyclone combustor is that the ash layer remains in a molten state with sufficiently low viscosity to permit adequate drainage of the slag. Difficulties in achieving this condition contribute to reduced on-stream time and restricted load-following capability in conveniently-operated air-fuel slagging cyclone combustors. Experience has determined that the critical viscosity for adequate drainage is 250 centipoise. As previously noted, the temperature corresponding to this viscosity level is T250. Stable operation of a slagging cyclone combustor requires the temperature of the slag to be greater than or equal to T250. This requirement places limits on the allowable range of coals and operating conditions, while also contributing to higher NOx emissions than encountered in many pulverized coal combustion systems.

It is desired to have a method and a system to permit refueling of cyclone combustors with coals that are not amenable to air/fuel-fired cyclone operation due to the inability to maintain a molten slag layer of sufficiently low viscosity to permit continuous slag flow.

It is further desired to have a method and system to increase the range of operating envelope (e.g., firing rate, stoichiometric ratio, coal grind size) of a cyclone boiler without incurring freezing of slag or degradation of boiler efficiency.

It is still further desired to have a method and a system to minimize the escape of fine coal particles from the barrel of a cyclone combustor.

It is still further desired to have a method and a system to lower NOx emissions in slagging cyclone combustors while minimizing the risk of corrosion within the barrel.

It is still further desired to have a method and a system to improve unit availability (i.e., on-stream time) by minimizing temperature excursions that result in freezing of the slag.

It also is desired to have a method and a system for combusting a fuel in a cyclone combustor which afford better performance than the prior art, and which also overcome many of the difficulties and disadvantages of the prior art to provide better and more advantageous results.

BRIEF SUMMARY OF THE INVENTION

The present invention is a method and a system for operating a cyclone combustor. The invention also includes a method and a system for extending a range of amenable fuel types and operating parameters of a slagging cyclone combustor. In addition, the invention includes a method and a system for reducing nitrogen oxide emissions from a plurality of products of combustion generated during combustion of a fuel in a cyclone combustor. Finally, the invention includes a method and a system for operating a steam-generating boiler or furnace in communication with a cyclone combustor.

There are multiple steps in a first embodiment of the method for operating a cyclone combustor having a first burner and a second burner, each of the first burner and the second burner being in communication with a barrel having a longitudinal axis, a burner end adjacent at least one of the first burner and the second burner, and a throat end opposite the burner end. The first step is to feed a stream of a primary fuel and a primary oxidant having a first oxygen concentration into the first burner. The second step is to feed a stream of a secondary fuel and a secondary oxidant having a second oxygen concentration greater than or equal to the first oxygen concentration into the second burner. The third step is to combust at least a portion of the primary fuel with at least a portion of the primary oxidant in the barrel of the cyclone combustor, thereby forming a plurality of primary products of combustion in the barrel of the cyclone combustor. The fourth step is to combust at least a portion of the secondary fuel with at least a portion of the secondary oxidant, thereby forming a plurality of secondary products of combustion and a secondary flame, the secondary flame generating a supplemental radiant heat in the barrel of the cyclone combustor.

There are many variations of the first embodiment of the method for operating a cyclone combustor. In one variation, the primary fuel is coal and the secondary fuel is a non-solid fuel. In another variation, the secondary flame has a longitudinal axis substantially parallel to the longitudinal axis of the barrel of the cyclone combustor.

In another variation of the first embodiment, the second burner has a longitudinal axis substantially parallel to the longitudinal axis of the barrel of the cyclone combustor. In a variant of that variation, at least a portion of the second burner is adjacent the first burner.

In yet another variation of the first embodiment, the first oxygen concentration is about 21 vol. % and the second oxygen concentration is greater than about 21 vol. %. In a variant of that variation, the secondary flame has a longitudinal axis substantially parallel to the longitudinal axis of the barrel of the cyclone combustor.

In still yet another variation of the first embodiment, the secondary fuel and the secondary oxidant are combusted at a stoichiometric ratio less than 1.0. A second embodiment of the method for operating a cyclone combustor is a variant of this variation but includes an additional step. The additional step is to mix the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide emissions contained in the primary products of combustion.

Another embodiment is a method for operating a slagging cyclone combustor in communication with a furnace while minimizing an amount of nitrogen oxide emissions contained in a plurality of primary products of combustion generated during combustion of a coal in the slagging cyclone combustor, the slagging cyclone combustor having a first burner and a second burner, each of the first burner and the second burner being in communication with a barrel having a longitudinal axis, a burner end adjacent at least one of the first burner and the second burner, and a throat end opposite the burner end. This embodiment includes multiple steps. The first step is to feed a stream of the coal and a primary oxidant having a first oxygen concentration of about 21 vol. % into the first burner. The second step is to feed a stream of a secondary fuel and a secondary oxidant having a second oxygen concentration greater than about 21 vol. % in to the second burner, at least a portion of the second burner being adjacent the first burner. The third step is to combust at least a portion of the coal with at least a portion of a primary oxidant in the barrel of the slagging cyclone combustor, thereby forming a plurality of primary products of combustion in the barrel of the slagging cyclone combustor and a stable and continuous flow of a molten slag in the barrel of the slagging cyclone combustor. The fourth step is to combust at least a portion of the secondary fuel with at least a portion of the secondary oxidant, thereby forming a plurality of secondary products of combustion and a secondary flame, the secondary flame generating a supplemental radiant heat in the barrel of the slagging cyclone combustor and having a longitudinal axis substantially parallel to the longitudinal axis of the barrel of the slagging cyclone combustor, wherein at least a portion of the supplemental radiant heat is transferred to at least a portion of the molten slag in the barrel of the slagging cyclone combustor. The fifth step is to mix the plurality of primary products of combustion with the plurality of secondary products of combustion near the throat end of the slagging cyclone combustor, the plurality of secondary products of combustion containing a quantity of hydrocarbon radical species that react with the plurality of the primary products of combustion, thereby acting to lower the amount of nitrogen oxide emissions contained in the plurality of primary products of combustion, wherein the secondary fuel and the secondary oxidant are combusted at a stoichiometric ratio less than 1.0. The sixth step is to drain at least a portion of the stable and continuous flow of the molten slag from the barrel of the slagging cyclone combustor. The seventh step is to transfer at least a portion of the plurality of primary products of combustion and at least a portion of the secondary products of combustion from the slagging cyclone combustor to the furnace.

There are several embodiments of the method for extending a range of amenable fuel types and operating parameters of a slagging cyclone combustor having a first burner and a second burner, each of the first burner and the second burner being in communication with a barrel having a longitudinal axis, a burner end adjacent at least one of the first burner and the second burner, and a throat end opposite the burner end. The first embodiment of this method includes multiple steps. The first step is to feed a stream of a primary fuel and a primary oxidant having a first oxygen concentration into the first burner. The second step is to feed a stream of a secondary fuel and a secondary oxidant having a second oxygen concentration greater than or equal to the first oxygen concentration into the second burner. The third step is to combust at least a portion of the primary fuel with at least a portion of the primary oxidant in the barrel of the slagging cyclone combustor, thereby forming a plurality of primary products of combustion and a stable and continuous flow of a molten slag in the barrel of the slagging cyclone combustor. The fourth step is to combust at least a portion of the secondary fuel with at least a portion of the secondary oxidant, thereby forming a plurality of secondary products of combustion and a secondary flame, the secondary flame generating a supplemental radiant heat in the barrel of the slagging cyclone combustor.

A second embodiment of this method includes the additional step of draining at least a portion of the stable and continuous flow of the molten slag from the barrel of the slagging cyclone combustor. In a variation of the first or second embodiments of this method, the primary fuel is coal.

There also are several embodiments of the method for reducing nitrogen oxide emissions from a plurality of products of combustion generated during combustion of a fuel in a cyclone combustor having a first burner and a second burner, each of the first burner and the second burner being in communication with a barrel having a longitudinal axis, a burner end adjacent at least one of the first burner and the second burner, and a throat end opposite the burner end. The first embodiment of this method includes multiple steps. The first step is to feed a stream of a primary fuel and a primary oxidant having a first oxygen concentration into the first burner. The second step is to feed a stream of a secondary fuel and a secondary oxidant having a second oxygen concentration greater than or equal to the first oxygen concentration into the second burner. The third step is to combust at least a portion of the primary fuel with at least a portion of the primary oxidant in the barrel of the cyclone combustor, thereby forming a plurality of primary products of combustion in the barrel of the cyclone combustor. The fourth step is to combust at least a portion of the secondary fuel with at least a portion of the secondary oxidant at a stoichiometric ratio less than 1.0, thereby forming a plurality of secondary products of combustion and a secondary flame, the secondary flame generating a supplemental radiant heat in the barrel of the cyclone combustor. The fifth step is to mix the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide contained in the primary products of combustion.

A second embodiment of this method is similar to the first embodiment, with one variation, but includes three additional steps. The variation is that the throat end of the barrel of the cyclone combustor is in fluid communication with a furnace. The first additional step is to transfer at least a portion of the plurality of the primary and secondary products of combustion from the barrel of the cyclone combustor to the furnace. The second additional step is to feed a stream of an auxiliary fuel into the furnace. The third additional step is to combust at least a portion of the auxiliary fuel in the furnace.

There are multiple steps in the method for operating a steam-generating boiler or furnace in communication with a cyclone combustor having a first burner and a second burner, each of the first burner and the second burner being in communication with a barrel having a longitudinal axis, a burner end adjacent at least one of the first burner and the second burner, and a throat end opposite the burner end. The first step is to feed a stream of a primary fuel and a primary oxidant having a first oxygen concentration into the first burner. The second step is to feed a stream of a secondary fuel and a secondary oxidant having a second oxygen concentration greater than or equal to the first oxygen concentration into the second burner. The third step is to combust at least a portion of the primary fuel with at least a portion of the primary oxidant in the barrel of the cyclone combustor, thereby generating a first amount of heat in the barrel of the cyclone combustor. The fourth step is to combust at least a portion of the secondary fuel with at least a portion of the secondary oxidant, thereby generating a second amount of heat and a secondary flame, the secondary flame generating a supplemental radiant heat in the barrel of the cyclone combustor. The fifth step is to transfer at least a portion of the first and second amounts of heat from the barrel of the cyclone combustor to the steam-generating boiler or furnace.

There are multiple elements in a first embodiment of the system for operating a cyclone combustor having a first burner and a second burner, each of the first burner and the second burner being in communication with a barrel having a longitudinal axis, a burner end adjacent at least one of the first burner and the second burner, and a throat end opposite the burner end. The first element is a means for feeding a stream of a primary fuel and a primary oxidant having a first oxygen concentration into the first burner. The second element is a means for feeding a stream of a secondary fuel and a secondary oxidant having a second oxygen concentration greater than or equal to the first oxygen concentration into the second burner. The third element is a means for combusting at least a portion of the primary fuel with at least a portion of the primary oxidant in the barrel of the cyclone combustor, thereby forming a plurality of primary products of combustion in the barrel of the cyclone combustor. The fourth element is a means for combusting at least a portion of the secondary fuel with at least a portion of the secondary oxidant, thereby forming a plurality of secondary products of combustion and a secondary flame, the secondary flame generating a supplemental radiant heat in the barrel of the cyclone combustor.

There are many variations of the first embodiment of the system for operating a cyclone combustor. In one variation, the primary fuel is coal and the secondary fuel is a non-solid fuel. In another variation, the secondary flame has a longitudinal axis substantially parallel to the longitudinal axis of the barrel of the cyclone combustor.

In another variation of the first embodiment, the second burner has a longitudinal axis substantially parallel to the longitudinal axis of the barrel of the cyclone combustor. In a variant of this variation, at least a portion of the second burner is adjacent the first burner.

In yet another variation of the first embodiment of the system, the first oxygen concentration is about 21 vol. % and the second oxygen concentration is greater than about 21 vol. %. In a variant of this variation, the secondary flame has a longitudinal axis substantially parallel to the longitudinal axis of the barrel of the cyclone combustor.

In still yet another variation of the first embodiment of the system, the secondary fuel and the secondary oxidant are combusted at a stoichiometric ratio less than 1.0. A second embodiment of the system for operating a cyclone combustor is a variant of this variation and includes an additional element. The additional element is a means for mixing the plurality of primary products of combustion with the plurality of secondary products combustion near the throat end of the cyclone combustor, the secondary products of combustion containing a quantity of hydrocarbon radical species that react with the primary products of combustion, thereby acting to lower an amount of nitrogen oxide emissions contained in the primary products of combustion.

Another embodiment is a system for operating a slagging cyclone combustor in communication with a furnace while minimizing an amount of nitrogen oxide emissions contained in a plurality of primary products of combustion generated during combustion of a coal in the slagging cyclone combustor, the slagging cyclone combustor having a first burner and a second burner, each of the first burner and the second burner being in communication with a barrel having a longitudinal axis, a burner end adjacent at least one of the first burner and the second burner, and a throat end opposite the burner end. This embodiment includes multiple elements. The first element is a means for feeding a stream of the coal and a primary oxidant having a first oxygen concentration of about 21 vol. % into the first burner. The second element is a means for feeding a stream of a secondary fuel and a secondary oxidant having a second oxygen concentration greater than about 21 vol. % into the second burner, at least a portion of the second burner adjacent the first burner. The third element is a means for combusting at least a portion of the coal with at least a portion of the primary oxidant in the barrel of the slagging cyclone combustor, thereby forming a plurality of primary products of combustion in the barrel of the slagging cyclone combustor and a stable and continuous flow of a molten slag in the barrel of the slagging cyclone combustor. The fourth element is means for combusting at least a portion of the secondary fuel with at least a portion of the secondary oxidant, thereby forming a plurality of secondary products of combustion and a secondary flame, the secondary flame generating a supplemental radiant heat in the barrel of the slagging cyclone combustor and having a longitudinal axis substantially parallel to the longitudinal axis of the barrel of the slagging cyclone combustor, wherein at least a portion of the supplemental radiant heat is transferred to at least a portion of the molten slag in the barrel of the slagging cyclone combustor. The fifth element is a means for mixing the plurality of primary products of combustion with the plurality of secondary products of combustion near the throat end of the slagging cyclone combustion, the plurality of secondary products of combustion containing a quantity of hydrocarbon radical species that react with the plurality of the primary products of combustion, thereby acting to lower the amount of nitrogen oxide emissions contained in the plurality of primary products of combustion, wherein the secondary fuel and the secondary oxidant are combusted at a stoichiometric ratio less than 1.0. The sixth element is a means for draining at least a portion of the stable and continuous flow of the molten slag from the barrel of the slagging cyclone combustor. The seventh element is a means for transferring at least a portion of the plurality of primary products of combustion and at least a portion of the secondary products of combustion from the slagging cyclone combustor to the furnace.

There are several embodiments of the system for extending a range of amenable fuel types and operating parameters of a slagging cyclone combustor having a first burner and a second burner, each of the first burner and the second burner being in communication with a barrel having a longitudinal axis, a burner end adjacent at least one of the first burner and the second burner, and a throat end opposite the burner end. The first embodiment of this system includes multiple elements. The first element is a means for feeding a stream of a primary fuel and a primary oxidant having a first oxygen concentration into the first burner. The second element is a means for feeding a stream of a secondary fuel and a secondary oxidant having a second oxygen concentration greater than or equal to the first oxygen concentration into the second burner. The third element is a means for combusting at least a portion of the primary fuel with at least a portion of the primary oxidant in the barrel of the slagging cyclone combustor, thereby forming a plurality of primary products of combustion and a stable and continuous flow of a molten slag in the barrel of the slagging cyclone combustor. The fourth element is a means for combusting at least a portion of the secondary fuel with at least a portion of the secondary oxidant, thereby forming a plurality of secondary products of combustion and a secondary flame, the secondary flame generating a supplemental radiant heat in the barrel of the slagging cyclone combustor.

A second embodiment of this system is similar to the first embodiment but includes the additional element of a means for draining at least a portion of the stable and continuous flow of the molten slag from the barrel of the slagging cyclone combustor. In a variation of the first or second embodiments of this system, the primary fuel is coal.

There also are several embodiments of the system for reducing nitrogen oxide emissions from a plurality of products of combustion generated during combustion of a fuel in a cyclone combustor having a first burner and a second burner, each of the first burner and the second burner being in communication with a barrel having a longitudinal axis, a burner end adjacent at least one of the first burner and the second burner, and a throat end opposite the burner end. The first embodiment of the system includes multiple elements. The first element is a means for feeding a stream of a primary fuel and a primary oxidant having a first oxygen concentration into the first burner. The second element is a means for feeding a stream of a secondary fuel and a secondary oxidant having a second oxygen concentration greater than or equal to the first oxygen concentration into the second burner. The third element is a means for combusting at least a portion of the primary fuel with at least a portion of the primary oxidant in the barrel of the cyclone combustor, thereby forming a plurality of primary products of combustion in the barrel of the cyclone combustor. The fourth element is a means for combusting at least a portion of the secondary fuel with at least a portion of the secondary oxidant at a stoichiometric ratio less than 1.0, thereby forming a plurality of secondary products of combustion and a secondary flame, the secondary flame generating a supple-mental radiant heat in the barrel of the cyclone combustor. The fifth element is a means for mixing the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide contained in the primary products of combustion.

A second embodiment of this system is similar to the first embodiment, with one variation, but includes three additional elements. The variation is that the throat end of the barrel of the cyclone combustor is in fluid communication with a furnace. The first additional element is a means for transferring at least a portion of the plurality of primary and secondary products of combustion from the barrel of the cyclone combustor to the furnace. The second additional element is a means for feeding a stream of an auxiliary fuel into the furnace. The third additional element is a means for combusting at least a portion of the auxiliary fuel in the furnace.

There are multiple elements in the system for operating a steam-generating boiler or furnace in communication with a cyclone combustor having a first burner and a second burner, each of the first burner and the second burner being in communication with a barrel having a longitudinal axis, a burner end adjacent at least one of the first burner and the second burner, and a throat end opposite the burner end. The first element is a means for feeding a stream of a primary fuel and a primary oxidant having a first oxygen concentration into the first burner. The second element is a means for feeding a stream of a secondary fuel and a secondary oxidant having a second oxygen concentration greater than or equal to the first oxygen concentration into the second burner. The third element is a means for combusting at least a portion of the primary fuel with at least a portion of the primary oxidant in the barrel of the cyclone combustor, thereby generating a first amount of heat in the barrel of the cyclone combustor. The fourth element is a means for combusting at least a portion of the secondary fuel with at least a portion of the secondary oxidant, thereby generating a second amount of heat and a secondary flame, the secondary flame generating a supplemental radiant heat in the barrel of the cyclone combustor. The fifth element is a means for transferring at least a portion of the first and second amounts of heat from the barrel of the cyclone combustor to the steam-generating boiler or furnace.

BRIEF DESCRIPTION OF THE DRAWINGS

The invention will be described by way of example with reference to the accompanying drawings, in which.

DETAILED DESCRIPTION OF THE INVENTION

The present invention is a method of operating a coal-fired slagging cyclone combustor in which an oxy/fuel burner, or oxygen-enriched air/fuel burner, or air/oxy/fuel burner (hereafter all referred to as an "oxygen-enriched burner") burning a secondary fuel is fired within the barrel of the cyclone combustor, with products of combustion of the secondary fuel discharging through the throat of the cyclone combustor into the main furnace. The secondary fuel fired in the oxygen-enriched burner may be any solid, liquid, or gaseous fuel. The energy content of the secondary fuel stream (for example in Btu/hr) should be less than that of the primary fuel stream.

When coal is the primary fuel, the energy released from the combustion of the secondary fuel provides thermal energy in the form of radiant heat to the coal ash at the inner walls of the barrel of the slagging cyclone combustor. This supplemental radiation heat transfer can be used to ensure that the coal ash is maintained in a molten and continuously flowing state. In one embodiment, the secondary combustion process is operated with less than the stoichiometric requirement of oxygen for the secondary fuel, and thereby reduces the NOx emissions generated from the primary (coal) combustion process.

Figure 1:
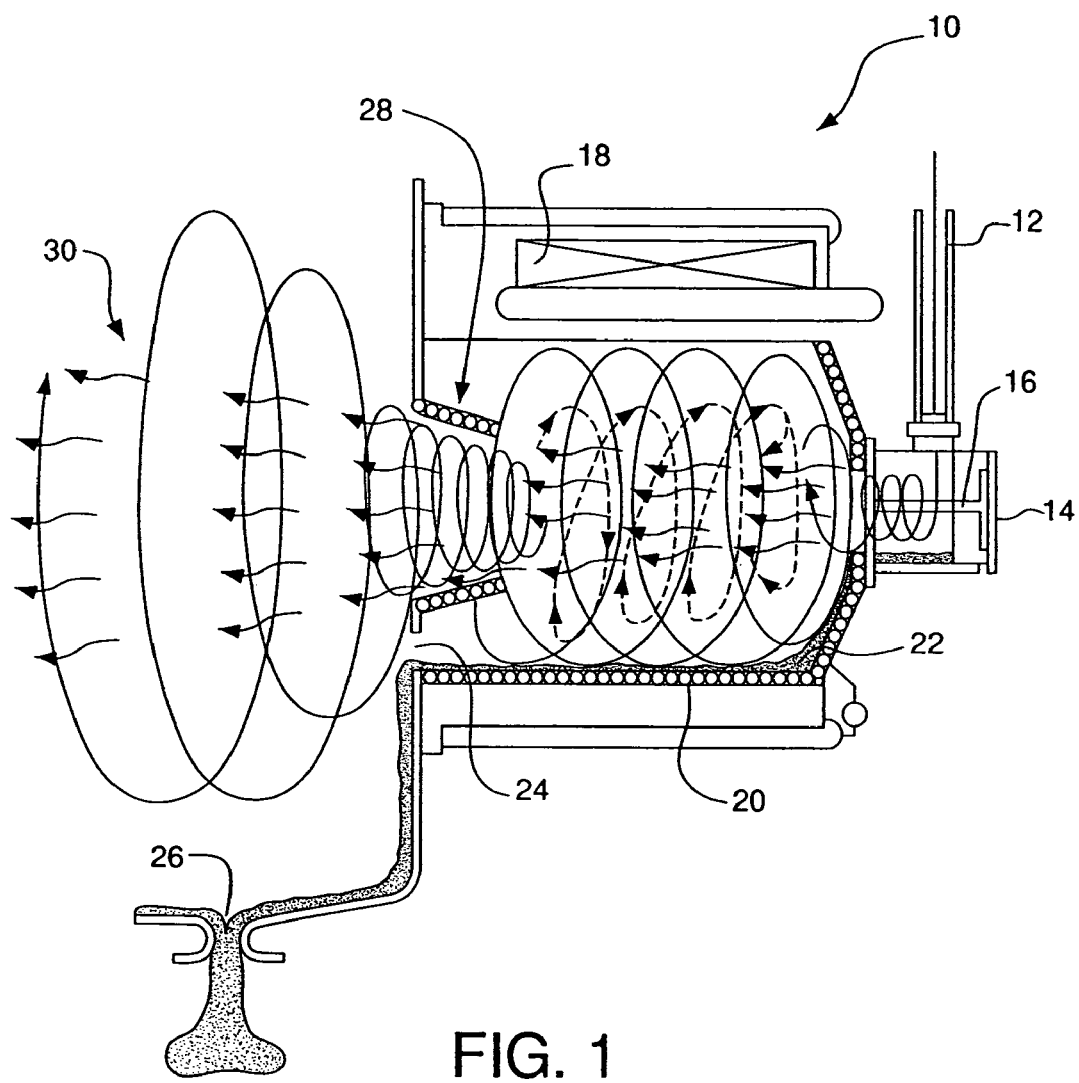
FIG. 1 is a schematic diagram illustrating a sectional view of a typical cyclone combustor in which incoming fuel particles are thrown to the walls of the barrel by centrifugal force.
Figure 2:
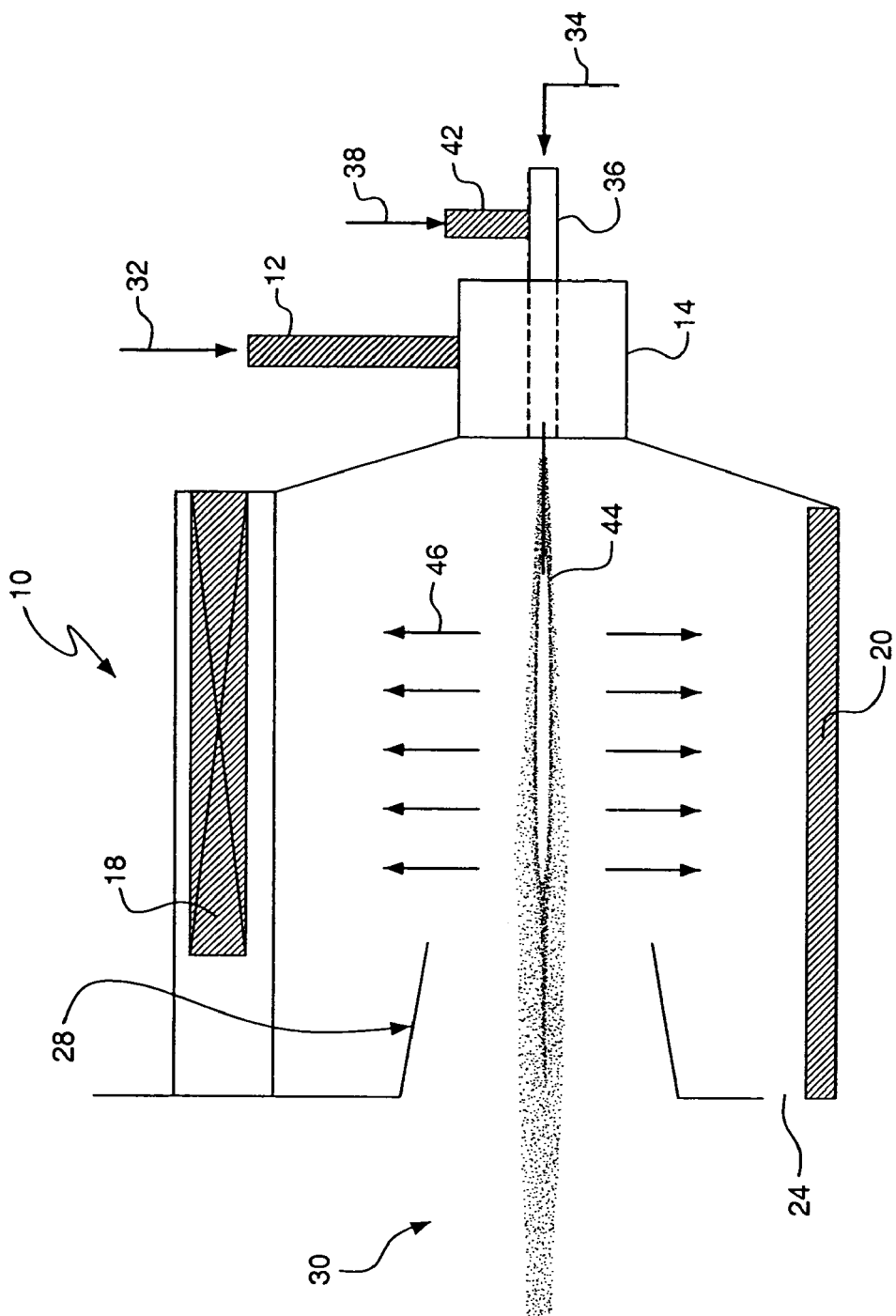
FIG. 2 is a schematic diagram illustrating a sectional view of the basic configuration for one embodiment of the present invention.

An illustration of the basic configuration for one embodiment of the present invention is shown in FIG. 2. Alternate embodiments using solid, liquid, and gaseous secondary fuels are shown in FIGS. 3, 4 and 5, respectively.

Referring to FIG. 2, a coal and primary air mixture 32 is injected through the coal pipe 12 to the primary burner 14. Secondary fuel 34 is fed to the secondary burner 36, which also receives oxygen-enriched oxidant 38 through the oxidant inlet 42. Secondary air enters the cyclone combustor 10 at the secondary air inlet 18. Combustion of the secondary fuel in the oxygen-enriched oxidant results in the generation of an oxygen-enriched secondary flame 44 within the cyclone combustor. The secondary flame, which extends in FIG. 2 to the barrel throat (re-entrant throat) 28 into the furnace 30, radiates heat (as shown by arrows 46) radially outward to the slag layer (not shown). The molten slag exits at the slag spout opening.

Figure 3:
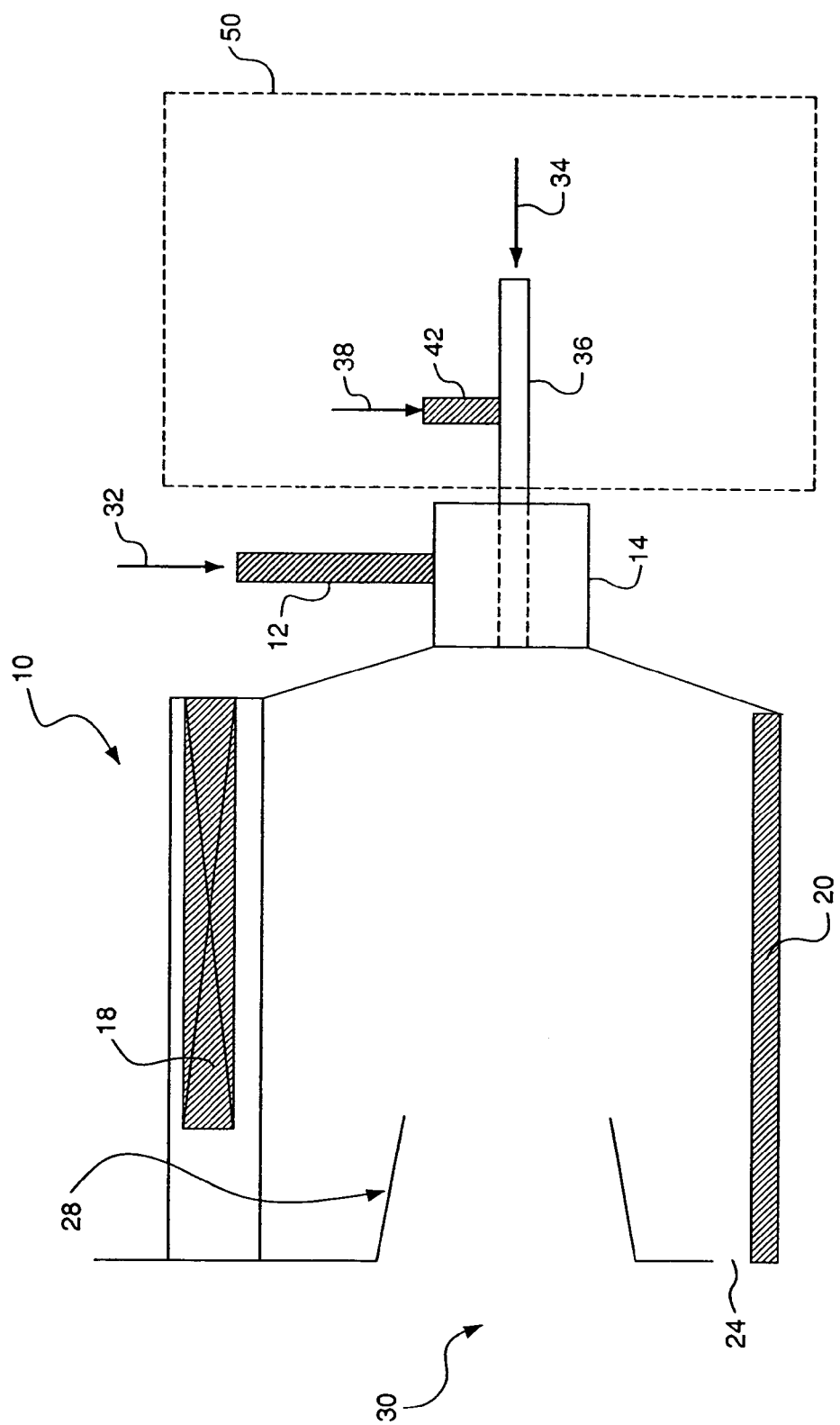
FIG. 3 is a schematic diagram illustrating a sectional view of an embodiment of the present invention using coal as a secondary fuel.

FIG. 3 shows another possible configuration for another embodiment of the invention in which coal is used as the secondary fuel 34 in the oxygen-enriched burner 50. In this embodiment, a coal and primary air mixture 32 is injected through the coal pipe 12 to the primary burner 14. The coal used as a secondary fuel 34 is fed to the secondary burner 36 by conveying air. Oxidant 38 in the form of air or oxygen-enriched air is fed to the secondary burner 36 through the oxidant inlet 42.

Figure 4:
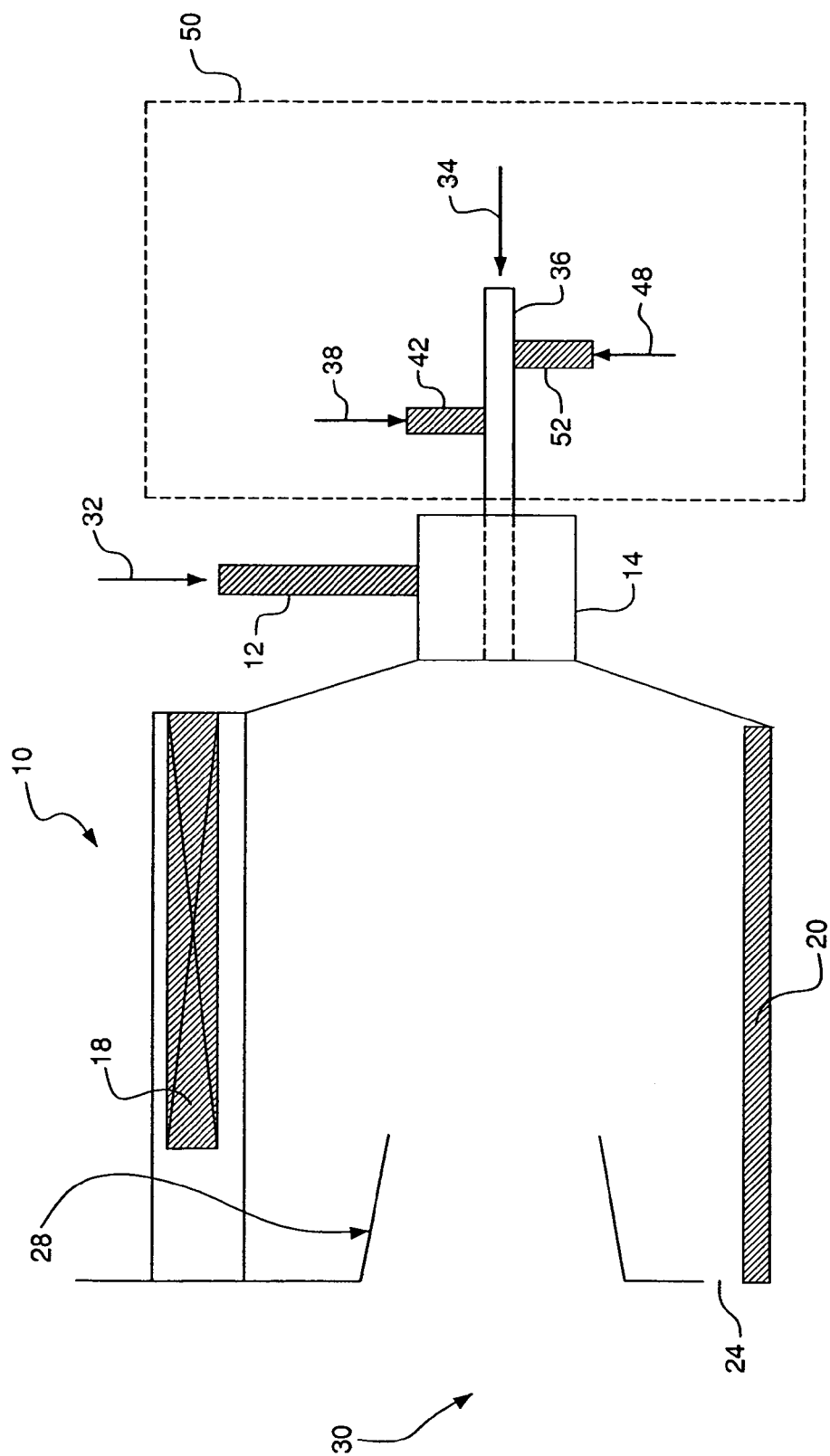
FIG. 4 is a schematic diagram illustrating a sectional view of an embodiment of the present invention using fuel oil as a secondary fuel.
Figure 5:
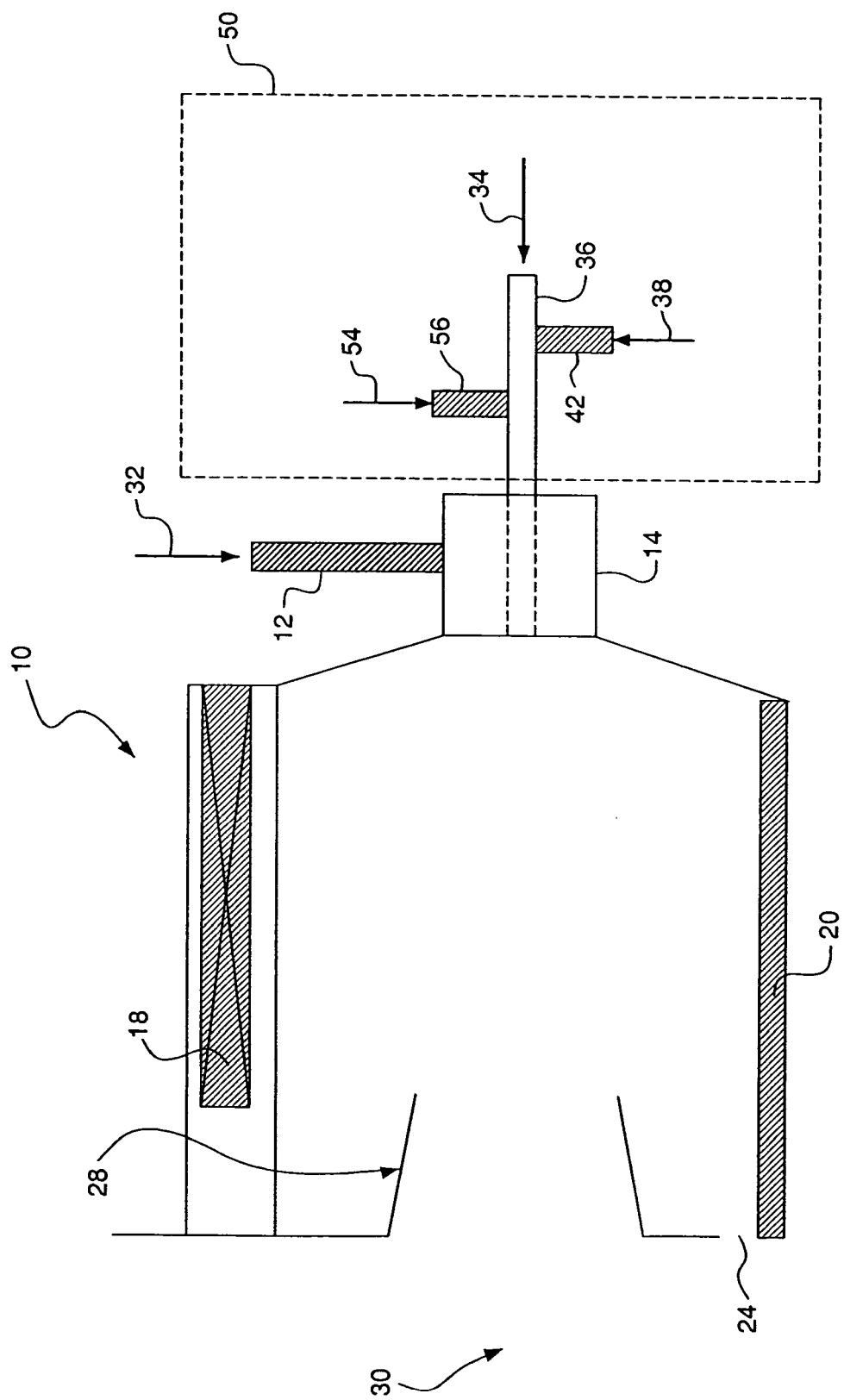
FIG. 5 is a schematic diagram illustrating a sectional view of an embodiment of the present invention using a gas, such as natural gas, as a secondary fuel.

FIG. 4 shows another embodiment using a liquid secondary fuel 34 in the oxygen-enriched burner 50. A coal and primary air mixture 32 is injected through the coal pipe 12 to the primary burner 14. Liquid secondary fuel 34 is fed to the secondary burner 36 wherein the stream of liquid secondary fuel is atomized by an atomizing fluid (e.g., oxygen) 48 fed to the secondary burner through the atomizer inlet 52. Oxidant 38 in the form of air or oxygen-enriched air is fed to the secondary burner through the oxidant inlet 42.

FIG. 5 shows another embodiment in which gaseous secondary fuel 34, such as natural gas, is used in the oxygen-enriched burner 50. A coal and primary air mixture 32 is injected through the coal pipe 12 to the primary burner 14. The gaseous fuel fed as a secondary fuel 34 to the secondary burner 36 combines with a principal oxidant (e.g., oxygen) 38 fed to the secondary burner 36 through the principal oxidant inlet 42. An additional oxidant 54 in the form of air or oxygen-enriched air is also fed to the secondary burner 36 through the additional oxidant inlet 56.

The primary action of the present invention is to deliver thermal energy from the oxygen-enriched secondary flame 44 to the slag layer in order to maintain the slag temperature above T250 and produce a stable and continuously flowing slag. The principal mode of delivering this thermal energy is through radiation heat transfer.

Figure 6:
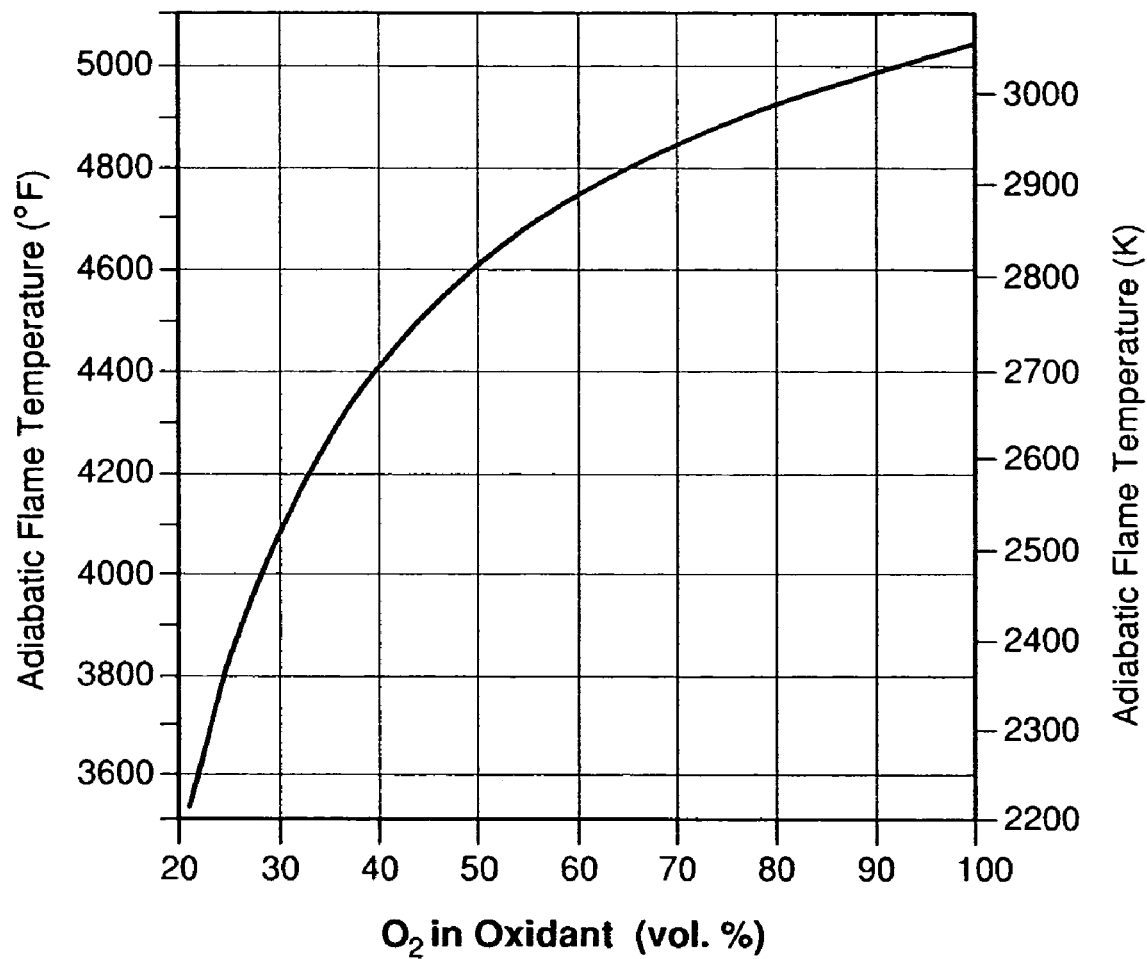
FIG. 6 is a graph of adiabatic flame temperature versus oxygen enrichment for a typical fossil fuel.

The radiation heat transfer potential of the oxygen-enriched secondary flame 44 can be understood by way of the impact of oxygen enrichment on flame temperature. The graph in FIG. 6 shows the variation of adiabatic flame temperature with oxygen enrichment for a typical fossil fuel. As shown in the graph, combustion with an oxidant comprised of 100% oxygen can commonly achieve maximum flame temperatures of the order of 5000° F., whereas air-fuel based combustion of the same fuel would yield a flame temperature of roughly 3500° F. Since radiation heat transfer is proportional to absolute temperature raised to the fourth power, it is clear that, relative to conventional air-fuel operation, radiant heat delivered to the slag layer can be substantially augmented with the present invention.

Increasing slag temperature in the present invention permits the stable burning of coals (primary fuel), such as those with high ash-fusion temperatures, that are not amenable to conventional air-fuel operation in slagging cyclone combustors. The supplemental radiation to the slag also allows for stable enlargement of the operating envelope (stoichiometric ratio, firing rate, coal grind size, etc.) for the cyclone without degradation of performance. For example, reduction of the barrel firing rate in conventional air-fuel operation causes a lowering of the slag temperature that increases slag viscosity and can lead to slag solidification. The present invention permits greater reductions in firing rate through enhanced radiation heat transfer to the slag layer that maintains the slag temperature at or above T250. This feature of the invention will be particularly useful in systems that utilize conventional "reburn" technology. In such systems, an auxiliary hydrocarbon fuel, introduced downstream from the primary combustion zone (i.e., in the boiler furnace outside the cyclone barrel), converts NOx to $N_2$ via reaction with CH radicals. The degree of NOx reduction that can be achieved with conventional reburn technology increases as the ratio of reburn fuel to cyclone barrel fuel increases. At fixed boiler thermal load, an increase in reburn fuel can only be achieved at the expense of a reduction in cyclone barrel firing rate, a trend that, with air-fuel firing, eventually leads to lowering of the barrel temperatures and solidification of slag. Use of the present invention will substantially extend the attainable turn-down in barrel firing rate and, consequently, increase the proportion of reburn fuel utilized. The invention also reduces the potential for slag solidification during normal "load-following" operation where the boiler output must frequently and quickly respond to changes in steam-generation demand. Hence, the invention can reduce down-time and increase unit availability.

The high-temperature oxygen-enriched secondary flame utilized in the present invention also enhances the combustion of fine coal particles that would otherwise escape the barrel. The invention is therefore capable of reducing fine particulate emissions and improving combustion efficiency.

In one embodiment, the present invention also reduces NOx emissions from slagging cyclone combustors. This benefit is achieved by operating the oxygen-enriched burner with less than the stoichiometric requirement of oxygen. This mode of operation generates an abundance of hydrocarbon radicals that initiate the reduction of NOx emissions generated from the primary coal combustion process back to $N_2$ as the primary products of combustion exit the cyclone combustor. This mode of operation is illustrated in FIG. 7.

Figure 7:
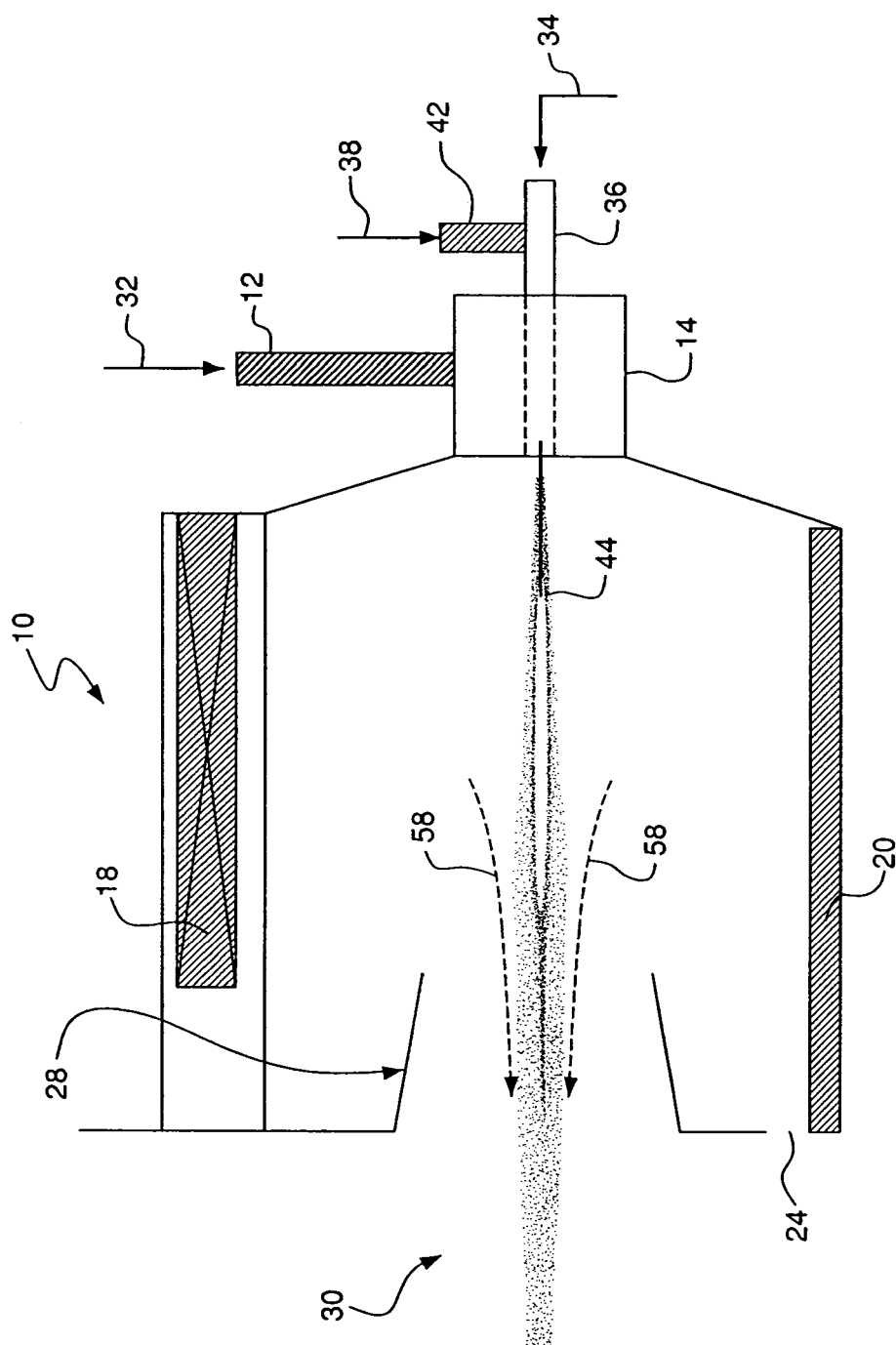
FIG. 7 is a schematic diagram illustrating a sectional view of an embodiment of the invention wherein products of primary combustion mix with products of fuel-rich oxygen-enriched secondary combustion in a manner resulting in a reduction of NOx emissions.

Referring to FIG. 7, a coal and primary air mixture 32 is injected through the coal pipe 12 to the primary burner 14. The secondary fuel 34 is fed to the secondary burner 36, which also receives an oxygen-enriched oxidant 38 through the oxidant inlet 42. Secondary air enters the cyclone combustor 10 at the secondary air inlet 18. The secondary flame 44 created by the fuel-rich oxygen-enriched secondary combustion extends through the barrel 20 toward the re-entrant throat 28, delivering thermal energy to the slag 22. As the secondary flame 44 discharges from the barrel 20 to the furnace 30, mixing occurs between products of combustion from the oxygen-enriched secondary flame 44 and the primary air-fuel combustion (as indicated by arrows 58). CH radicals from the high-temperature, fuel-rich secondary flame 44 initiate reduction of NOx to $N_2$ as gases enter the furnace.

The high-temperature oxygen-enriched secondary flame 44 provides an advantage over air-fuel secondary flames or non-oxidized secondary fuel streams because of the abundance of radicals it generates, and because the high-temperature oxygen-enriched secondary flame reduces the reaction time required for driving the reactions from NOx back to $N_2$. Moreover, the NOx reduction is effected without having to operate the primary combustion process with a stoichiometric ratio less than 1.0, thereby reducing the risk of long-term corrosion.

While specific embodiments of the present invention have been described in detail, persons skilled in the art will appreciate that various modifications and alterations may be developed in light of the overall teachings of the disclosure. For example, the invention may be used with many types of carbonaceous fuels for the primary and secondary fuels, including but not limited to: anthracite, bituminous, sub-bituminous, and lignitic coals; tar and emulsions thereof; bitumen and emulsions thereof; petroleum coke; petroleum oils and emulsions thereof; water and/or oil slurries of coal; paper mill sludge solids and sewage sludge solids; and combinations and mixtures of all of those fuels.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for operating a cyclone combustor having a first burner and a second burner, each of the first burner and the second burner being in communication with a barrel having a longitudinal axis, a burner end adjacent at least one of the first burner and the second burner, and a throat end opposite the burner end, comprising the steps of:

feeding a stream of a primary fuel and a primary oxidant having a first oxygen concentration of about 21 vol. % into the first burner;

feeding a stream of a secondary fuel and a secondary oxidant having a second oxygen concentration greater than about 21 vol. % into the second burner;

combusting at least a portion of the primary fuel with at least a portion of the primary oxidant in the barrel of the cyclone combustor, thereby forming a plurality of primary products of combustion in the barrel of the cyclone combustor; and combusting at least a portion of the secondary fuel with at least a portion of the secondary oxidant, thereby forming a plurality of secondary products of combustion and a secondary flame, the secondary flame generating a supplemental radiant heat in the barrel of the cyclone combustor.

2. A method as in claim 1, wherein the secondary flame has a longitudinal axis substantially parallel to the longitudinal axis of the barrel of the cyclone combustor.

3. A method as in claim 1, wherein the primary fuel is coal and the secondary fuel is a non-solid fuel.

4. A method as in claim 1, wherein the second burner has a longitudinal axis substantially parallel to the longitudinal axis of the barrel of the cyclone combustor.

5. A method as in claim 4, wherein at least a portion of the second burner is adjacent the first burner.

6. A method as in claim 1, wherein the secondary flame has a longitudinal axis substantially parallel to the longitudinal axis of the barrel of the cyclone combustor.

7. A method as in claim 1, wherein the secondary fuel and the secondary oxidant are combusted at a stoichiometric ratio less than 1.0.

8. A method as in claim 7, comprising the further step of:

mixing the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide emissions contained in the primary products of combustion.

9. A method for operating a slagging cyclone combustor in communication with a furnace while minimizing an amount of nitrogen oxide emissions contained in a plurality of primary products of combustion generated during combustion of a coal in the slagging cyclone combustor, the slagging cyclone combustor having a first burner and a second burner, each of the first burner and the second burner being in communication with a barrel having a longitudinal axis, a burner end adjacent at least one of the first burner and the second burner, and a throat end opposite the burner end, comprising the steps of:

feeding a stream of the coal and a primary oxidant having a first oxygen concentration of about 21 vol. % into the first burner;

feeding a stream of a secondary fuel and a secondary oxidant having a second oxygen concentration greater than about 21 vol. % into the second burner, at least a portion of the second burner being adjacent the first burner;

combusting at least a portion of the coal with at least a portion of the primary oxidant in the barrel of the slagging cyclone combustor, thereby forming the plurality of primary products of combustion in the barrel of the slagging cyclone combustor and a stable and continuous flow of a molten slag in the barrel of the slagging cyclone combustor;

combusting at least a portion of the secondary fuel with at least a portion of the secondary oxidant, thereby forming a plurality of secondary products of combustion and a secondary flame, the secondary flame generating a supplemental radiant heat in the barrel of the slagging cyclone combustor and having a longitudinal axis substantially parallel to the longitudinal axis of the barrel of the slagging cyclone combustor, wherein at least a portion of the supplemental radiant heat is transferred to at least a portion of the molten slag in the barrel of the slagging cyclone combustor;

mixing the plurality of primary products of combustion with the plurality of secondary products of combustion near the throat end of the slagging cyclone combustor, the plurality of secondary products of combustion containing a quantity of hydrocarbon radical species that react with the plurality of the primary products of combustion, thereby acting to lower the amount of nitrogen oxide emissions contained in the plurality of primary products of combustion, wherein the secondary fuel and the secondary oxidant are combusted at a stoichiometric ratio less than 1.0;

draining at least a portion of the stable and continuous flow of the molten slag from the barrel of the slagging cyclone combustor; and transferring at least a portion of the plurality of primary products of combustion and at least a portion of the secondary products of combustion from the slagging cyclone combustor to the furnace.

10. A method for reducing nitrogen oxide emissions from a plurality of products of combustion generated during combustion of a fuel in a cyclone combustor having a first burner and a second burner, each of the first burner and the second burner being in communication with a barrel having a longitudinal axis, a burner end adjacent at least one of the first burner and the second burner, and a throat end opposite the burner end, comprising the steps of:

feeding a stream of a primary fuel and a primary oxidant having a first oxygen concentration into the first burner;

feeding a stream of a secondary fuel and a secondary oxidant having a second oxygen concentration greater than or equal to the first oxygen concentration into the second burner;

combusting at least a portion of the primary fuel with at least a portion of the primary oxidant in the barrel of the cyclone combustor, thereby forming a plurality of primary products of combustion in the barrel of the cyclone combustor;

combusting at least a portion of the secondary fuel with at least a portion of the secondary oxidant at a stoichiometric ratio less than 1.0, thereby forming a plurality of secondary products of combustion and a secondary flame, the secondary flame generating a supplemental radiant heat in the barrel of the cyclone combustor; and mixing the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide contained in the primary products of combustion.

11. A method as in claim 10, wherein the throat end of the barrel of the cyclone combustor is in fluid communication with a furnace, comprising the further steps of:

transferring at least a portion of the plurality of the primary and secondary products of combustion from the barrel of the cyclone combustor to the furnace;

feeding a stream of an auxiliary fuel into the furnace; and combusting at least a portion of the auxiliary fuel in the furnace.

12. A method for operating a steam-generating boiler or furnace in communication with a cyclone combustor having a first burner and a second burner, each of the first burner and the second burner being in communication with a barrel having a longitudinal axis, a burner end adjacent at least one of the first burner and the second burner, and a throat end opposite the burner end, comprising the steps of:

feeding a stream of a primary fuel and a primary oxidant having a first oxygen concentration into the first burner;

feeding a stream of a secondary fuel and a secondary oxidant having a second oxygen concentration greater than or equal to the first oxygen concentration into the second burner;

combusting at least a portion of the primary fuel with at least a portion of the primary oxidant in the barrel of the cyclone combustor, thereby generating a first amount of heat in the barrel of the cyclone combustor;

combusting at least a portion of the secondary fuel with at least a portion of the secondary oxidant, thereby generating a second amount of heat and a secondary flame, the secondary flame generating a supplemental radiant heat in the barrel of the cyclone combustor; and transferring at least a portion of the first and second amounts of heat from the barrel of the cyclone combustor to the steam-generating boiler or furnace.

13. A system for operating a cyclone combustor having a first burner and a second burner, each of the first burner and the second burner being in communication with a barrel having a longitudinal axis, a burner end adjacent at least one of the first burner and the second burner, and a throat end opposite the burner end, comprising:

means for feeding a stream of a primary fuel and a primary oxidant having a first oxygen concentration of about 21 vol. % into the first burner;

means for feeding a stream of a secondary fuel and a secondary oxidant having a second oxygen concentration greater than about 21 vol.% into the second burner;

means for combusting at least a portion of the primary fuel with at least a portion of the primary oxidant in the barrel of the cyclone combustor, thereby forming a plurality of primary products of combustion in the barrel of the cyclone combustor; and means for combusting at least a portion of the secondary fuel with at least a portion of the secondary oxidant, thereby forming a plurality of secondary products of combustion and a secondary flame, the secondary flame generating a supplemental radiant heat in the barrel of the cyclone combustor.

14. A system as in claim 13, wherein the secondary flame has a longitudinal axis substantially parallel to the longitudinal axis of the barrel of the cyclone combustor.

15. A system as in claim 13, wherein the primary fuel is coal and the secondary fuel is a non-solid fuel.

16. A system as in claim 13, wherein the second burner has a longitudinal axis substantially parallel to the longitudinal axis of the barrel of the cyclone combustor.

17. A system as in claim 16, wherein at least a portion of the second burner is adjacent the first burner.

18. A system as in claim 13, wherein the secondary flame has a longitudinal axis substantially parallel to the longitudinal axis of the barrel of the cyclone combustor.

19. A system as in claim 13, wherein the secondary fuel and the secondary oxidant are combusted at a stoichiometric ratio less than 1.0.

20. A system as in claim 19, further comprising:
means for mixing the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide emissions contained in the primary products of combustion.

21. A system for operating a slagging cyclone combustor in communication with a furnace while minimizing an amount of nitrogen oxide emissions contained in a plurality of primary products of combustion generated during combustion of a coal in the slagging cyclone combustor, the slagging cyclone combustor having a first burner and a second burner, each of the first burner and the second burner being in communication with a barrel having a longitudinal axis, a burner end adjacent at least one of the first burner and the second burner, and a throat end opposite the burner end, comprising:
means for feeding a stream of the coal and a primary oxidant having a first oxygen concentration of about 21 vol. % into the first burner;
means for feeding a stream of a secondary fuel and a secondary oxidant having a second oxygen concentration greater than about 21 vol. % into the second burner, at least a portion of the second burner being adjacent the first burner;
means for combusting at least a portion of the coal with at least a portion of the primary oxidant in the barrel of the slagging cyclone combustor, thereby forming the plurality of primary products of combustion in the barrel of the slagging cyclone combustor and a stable and continuous flow of a molten slag in the barrel of the slagging cyclone combustor;
means for combusting at least a portion of the secondary fuel with at least a portion of the secondary oxidant, thereby forming a plurality of secondary products of combustion and a secondary flame, the secondary flame generating a supplemental radiant heat in the barrel of the slagging cyclone combustor and having a longitudinal axis substantially parallel to the longitudinal axis of the barrel of the slagging cyclone combustor, wherein at least a portion of the supplemental radiant heat is transferred to at least a portion of the molten slag in the barrel of the slagging cyclone combustor;
means for mixing the plurality of primary products of combustion with the plurality of secondary products of combustion near the throat end of the slagging cyclone combustor, the plurality of secondary products of combustion containing a quantity of hydrocarbon radical species that react with the plurality of the primary products of combustion, thereby acting to lower the amount of nitrogen oxide emissions contained in the plurality of primary products of combustion, wherein the secondary fuel and the secondary oxidant are combusted at a stoichiometric ratio less than 1.0;
means for draining at least a portion of the stable and continuous flow of the molten slag from the barrel of the slagging cyclone combustor; and
means for transferring at least a portion of the plurality of primary products of combustion and at least a portion of the secondary products of combustion from the slagging cyclone combustor to the furnace.

22. A system for reducing nitrogen oxide emissions from a plurality of products of combustion generated during combustion of a fuel in a cyclone combustor having a first burner and a second burner, each of the first burner and the second burner being in communication with a barrel having a longitudinal axis, a burner end adjacent at least one of the first burner and the second burner, and a throat end opposite the burner end, comprising:
means for feeding a stream of a primary fuel and a primary oxidant having a first oxygen concentration into the first burner;
means for feeding a stream of a secondary fuel and a secondary oxidant having a second oxygen concentration greater than or equal to the first oxygen concentration into the second burner;
means for combusting at least a portion of the primary fuel with at least a portion of the primary oxidant in the barrel of the cyclone combustor, thereby forming a plurality of primary products of combustion in the barrel of the cyclone combustor;
means for combusting at least a portion of the secondary fuel with at least a portion of the secondary oxidant at a stoichiometric ratio less than 1.0, thereby forming a plurality of secondary products of combustion and a secondary flame, the secondary flame generating a supplemental radiant heat in the barrel of the cyclone combustor; and
means for mixing the plurality of primary products of combustion with the plurality of secondary products of combustion near the throat end of the cyclone combustor, the secondary products of combustion containing a quantity of hydrocarbon radical species that react with the primary products of combustion, thereby acting to lower an amount of nitrogen oxide contained in the primary products of combustion.

23. A system as in claim 22, wherein the throat end of the barrel of the cyclone combustor is in fluid communication with a furnace, further comprising:
means for transferring at least a portion of the plurality of the primary and secondary products of combustion from the barrel of the cyclone combustor to the furnace;
means for feeding a stream of an auxiliary fuel into the furnace; and
means for combusting at least a portion of the auxiliary fuel in the furnace.

24. A system for operating a steam-generating boiler or furnace in communication with a cyclone combustor having a first burner and a second burner, each of the first burner and the second burner being in communication with a barrel having a longitudinal axis, a burner end adjacent at least one of the first burner and the second burner, and a throat end opposite the burner end, comprising:
means for feeding a stream of a primary fuel and a primary oxidant having a first oxygen concentration into the first burner;
means for feeding a stream of a secondary fuel and a secondary oxidant having a second oxygen concentration greater than or equal to the first oxygen concenmeans for combusting at least a portion of the primary fuel with at least a portion of the primary oxidant in the barrel of the cyclone combustor, thereby generating a first amount of heat in the barrel of the cyclone combustor;

means for combusting at least a portion of the secondary fuel with at least a portion of the secondary oxidant, thereby generating a second amount of heat and a secondary flame, the secondary flame generating a supplemental radiant heat in the barrel of the cyclone combustor; and means for transferring at least a portion of the first and second amounts of heat from the barrel of the cyclone combustor to the steam-generating boiler or furnace.

* * * * *